Nov. 2, 1926.  1,605,253
I. MARTIN
ELECTRIC FAN AND SOCKET
Filed Nov. 10, 1925
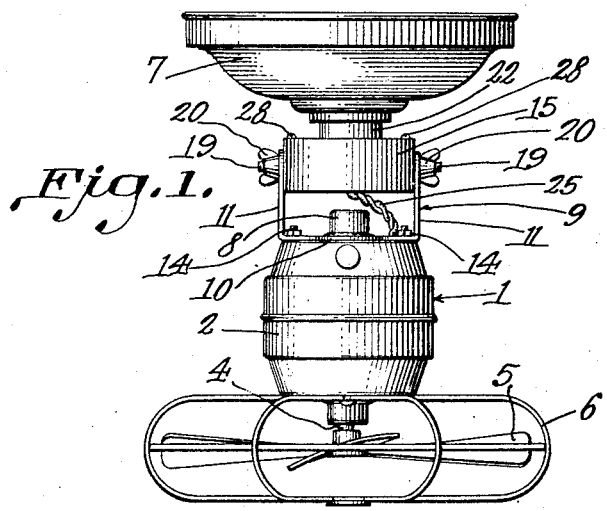
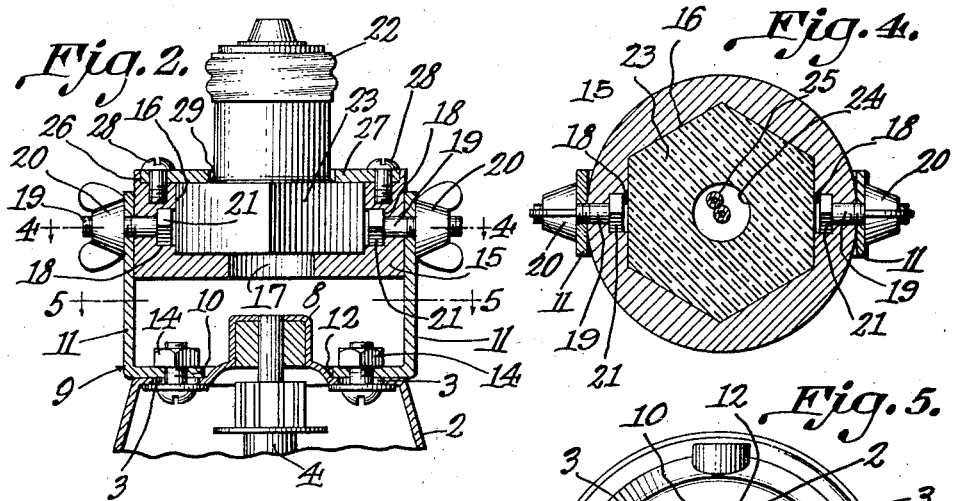
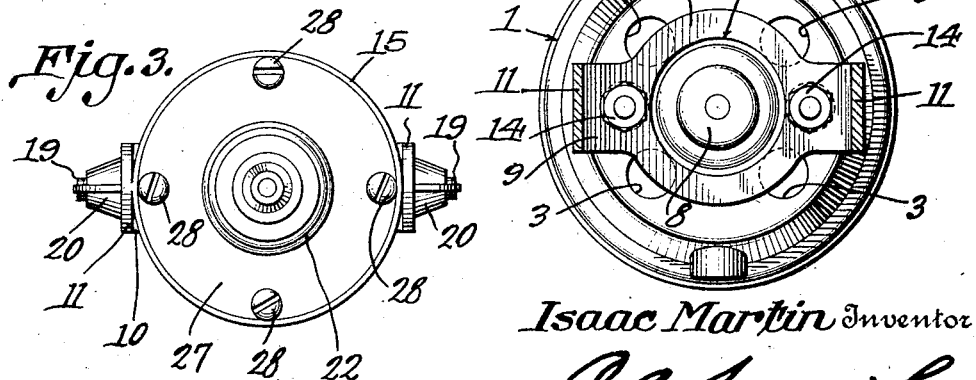
Isaac Martin Inventor
By C. A. Snow & Co.
Attorneys Patented Nov. 2, 1926.

1,605,253

UNITED STATES PATENT OFFICE.

ISAAC MARTIN, OF BROOKLYN, NEW YORK.

ELECTRIC FAN AND SOCKET.

Application filed November 10, 1925. Serial No. 68,133.

This invention aims to provide a novel means whereby an electric fan may be assembled with an electric lamp socket, it being unnecessary to stand the fan upright on a desk, table, shelf, or other object.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in elevation, a device constructed in accordance with the invention; Figure 2 is a fragmental longitudinal section wherein parts appear in elevation; Figure 3 is a top plan of the structure shown in Figure 2; Figures 4 and 5 are sections taken, respectively on the lines 4—4 and 5—5 of Figure 2.

The numeral 1 marks an electric motor comprising a casing 2 equipped at one end with ventilating openings 3. The shaft of the motor is marked by the numeral 4 and is journaled in a bearing 8 on the end of the casing 2. A fan 5 is connected to the shaft 4 and is located within the guard 6 mounted on the casing 2. The numeral 7 designates an ordinary electric lamp socket of any desired construction. No novelty is claimed for the parts above enumerated, saving in so far as they may enter into patentable combination with parts hereinafter described.

In carrying out the invention, there is provided a U-shape frame 9 including a base plate 10 and approximately parallel arms 11, the base plate 10 being broadened slightly in its intermediate portion, as shown in Figure 5, and being provided with an opening 12 adapted to receive the bearing 8 on the motor casing 2, when the base plate 10 is placed against the end of the motor casing. Securing devices 14 connect the base plate 10 of the frame 9 with the end of the motor casing 2.

Especial attention is directed to the fact that the securing devices 14 are engaged in the ventilating openings 3 which already exist in a standard form of casing 2. Heretofore, devices of the class described have met with no great amount of practical success, because it has been necessary to provide a special die, often costing as much as a thousand dollars, in order to effect a proper connection between the motor casing and other parts. This expensive item is done away with, because the securing devices 14 are engaged in certain of the ventilating openings 3 of the motor casing 2. Figure 5 shows that the base plate 10 of the frame 9 does not cover all of the openings 3, completely, and, therefore, the motor is permitted to have adequate ventilation.

A head 15 is located between the arms 11 of the frame 9. The head 15 is supplied in its upper surface with a polygonal recess 16. In the lower portion of the head 15 there is an opening 17 communicating with the recess 16. The head 15 has internal lateral seats 18 opening into the recess 16. The head 15 is carried on combined pivot elements and clamping devices, such as bolts 19 mounted in the arms 11, the bolts 19 carrying wing nuts 20 adapted to bear upon the arms 11. The heads 21 of the bolts 19 are received in the seats 18 of the head 15, and the bolts, thus, are held against rotation, so that the nuts 20 can be tightened up.

The numeral 22 denotes an electric plug adapted to be threaded into the socket 7. The plug 22 has an enlarged foot 23 received in the recess 16 of the head 15 and held against rotation therein, because the foot corresponds to the shape of the socket, as shown in Figure 4. The construction is such that the plug 22 can be threaded into the socket 7, and there will be no rotation between the plug 22, the head 15, and the frame 9. It is to be observed that the foot 23 lies at the inner ends of the bolts 19, and prevents the bolts 19 from sliding inwardly into the recess 16. The numeral 24 designates an opening in the foot 23 which, cooperating with the opening 17 in the part 15, permits the conductors 25 of the motor 1 to pass upwardly into electrical engagement with the plug 22. There is a shallow depression 26 in the outer end of the head 15. In the depression 26 is located a retainer 27, in the form of a plate, held in place by securing elements 28 passing through the plate and into the head 15, the retainer 27 having an opening 29 which receives the neck of the plug 22.

The device is so constructed that a fan motor may be assembled readily with an ordinary electric lamp socket. By loosening the wing nuts 20, the frame 11, carrying the motor 1 and the fan 5, may be swung to adjusted angles, it being possible to tighten up the nuts 20 and hold the parts specified in any position to which they may have been adjusted.

What is claimed is:—

In a device of the class described, a motor, a fan carried by the motor, a frame assembled with the motor and including arms, combined clamping and pivot elements carried by the arms, a head located between the arms and provided with a recess, the head being mounted on the pivot and connecting elements, an electrical clamping member including a foot received against rotation in the recess, and retaining means secured to the connecting member and overlapping the foot, thereby to hold the foot in the recess, the foot cooperating with the clamping and pivot elements to prevent them from sliding inwardly into the recess and becoming disengaged from the arms, the head having an opening through which a conductor may be extended from the connecting member to the motor.

In testimony that I claim the foregoing as my own, I have hereto affixed my signature.

ISAAC MARTIN.